April 27, 1926. 1,582,546
T. N. RUSSELL
BRAKE BOOSTER
Filed Oct. 17, 1924  4 Sheets-Sheet 1

Witnesses:
Arthur C. Wright.
Fred M. Davis.

Inventor:
Thomas N. Russell.
By Rummler & Rummler
Attorneys

April 27, 1926.
T. N. RUSSELL
BRAKE BOOSTER
Filed Oct. 17, 1924
1,582,546
4 Sheets-Sheet 2
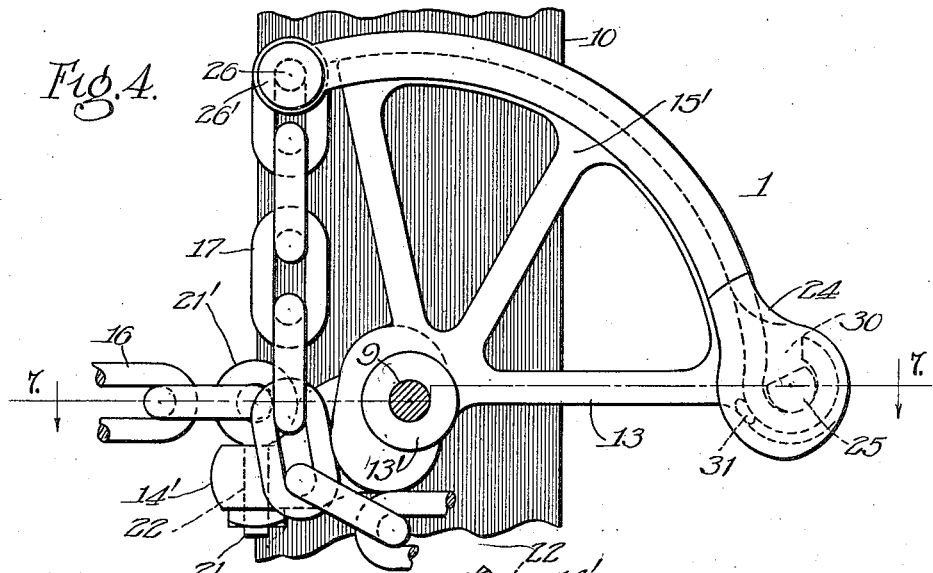
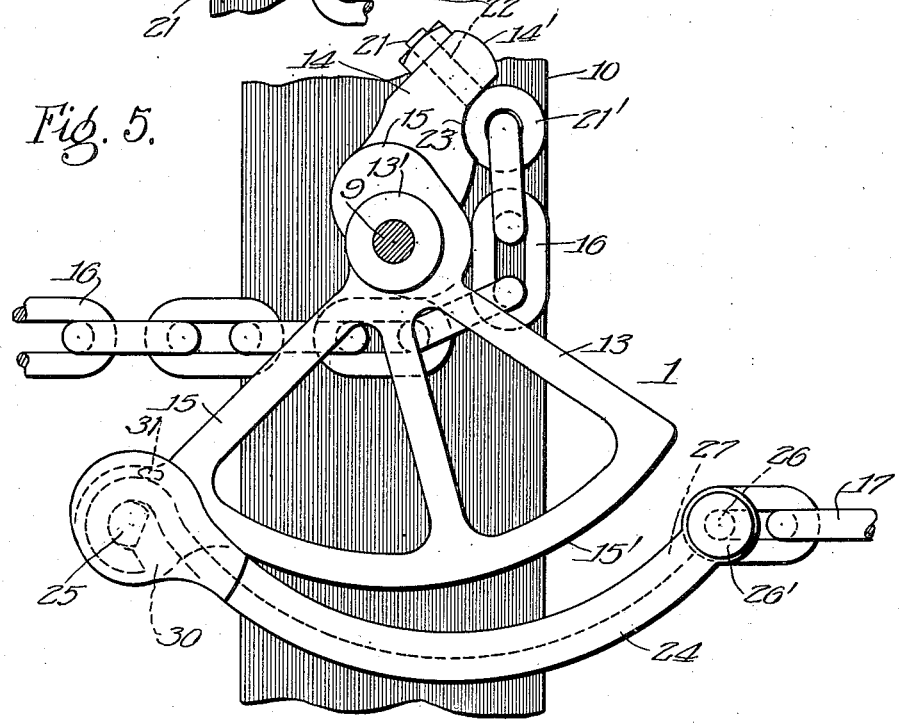
Witnesses
Arthur C. Wright
Fred M. Davis
Inventor
Thomas N. Russell.
By Rummler & Rummler
Attorneys

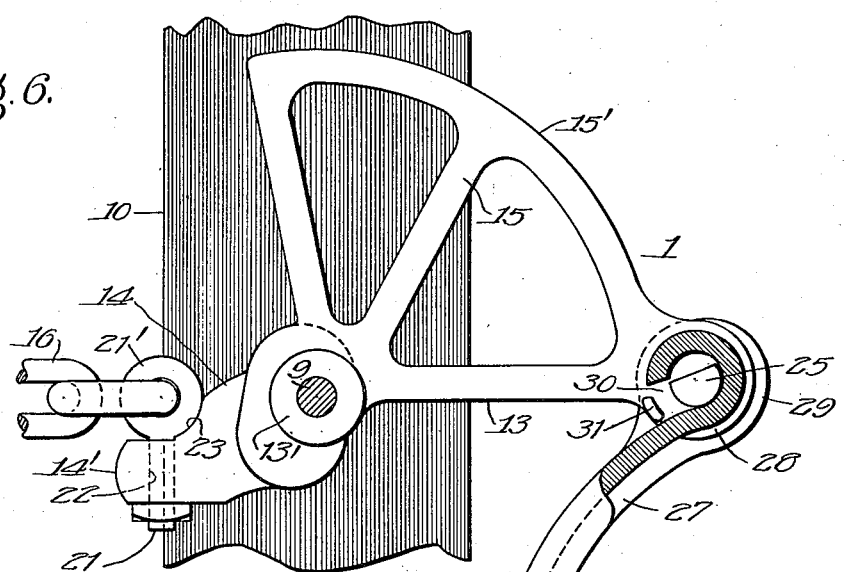
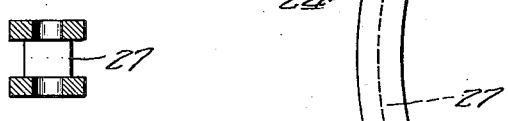
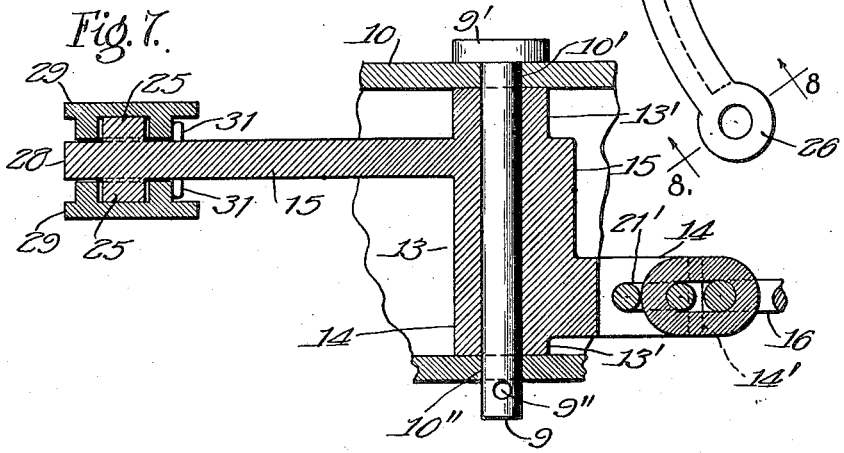

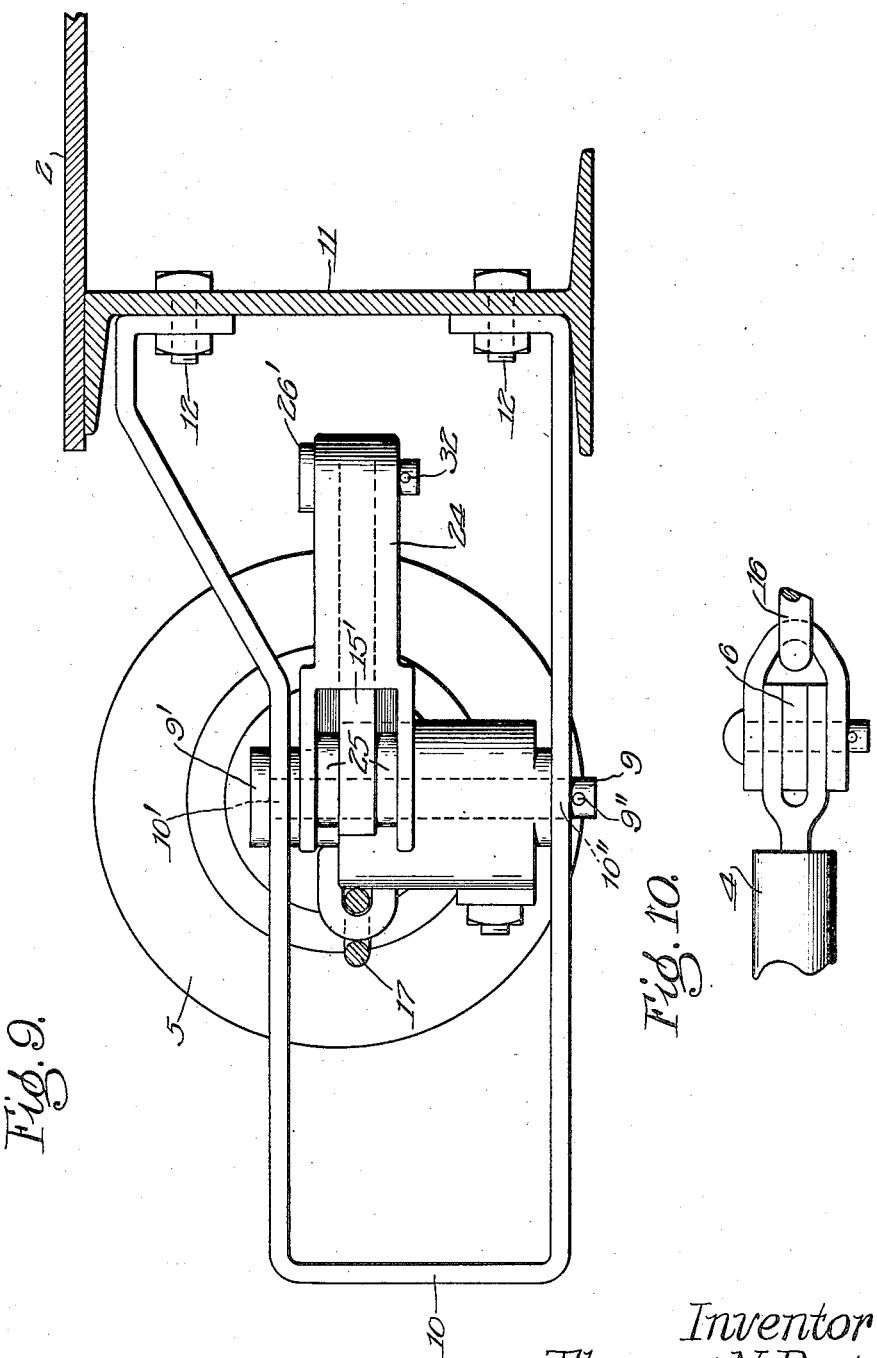

Patented Apr. 27, 1926.

1,582,546

UNITED STATES PATENT OFFICE.

THOMAS N. RUSSELL, OF CHICAGO, ILLINOIS.

BRAKE BOOSTER.

Application filed October 17, 1924. Serial No. 744,145.

*To all whom it may concern:*

Be it known that I, THOMAS N. RUSSELL, a citizen of the United States of America, and a resident of Chicago, county of Cook, and State of Illinois, have invented a new and useful Improvement in Brake Boosters, of which the following is a specification.

This invention relates to brake setting means, as for railway cars, and more especially to booster means for multiplying the manual force applied through hand brakes. The main objects of the invention are to provide an improved form of means for transmitting the manual power applied through the hand wheel to the brake member; to provide power multiplying or booster means of improved form adapted for taking up the slack by a relatively small movement of the handle member, and also capable of increasing the multiplying power progressively as the mechanism advances and the tension increases; to provide such a device of a minimum number of parts of simple form and suitable character consistent with dependability and efficiency, and to provide such a mechanism adapted for alternative use in connection with the usual forms of power brake setting mechanisms.

An illustrative embodiment of this invention is shown by the accompanying drawings, in which—

Fig. 4 is a greatly enlarged plan of the multiplier in its most relaxed position, normally assumed when the brake is not set.

Fig. 5 is a similarly enlarged plan of the multiplier in an intermediate brake setting position where its multiplying effect is rapidly increasing as it turns counter-clockwise.

Fig. 6 is substantially similar to Fig. 4 except that the arcuate cam link is swung around clockwise to its detachable position and the normally coacting chain is disconnected therefrom.

Fig. 7 is a vertical section through the booster mechanism on the line 7—7 of Fig. 4.

Fig. 8 is an axial section through the pintle receiving end of the booster cam link on the line 8—8 of Fig. 6.

Fig. 9 is mainly an enlarged end view of the brake setting multiplier member viewed as shown by the section line 9—9 of Fig. 1, and shows one side of the double cam booster drum and its support.

Fig. 10 is an enlarged front view of the joint connecting the air brake push-rod, the manual pull chain and the equalizing brake lever.

Figure 1:
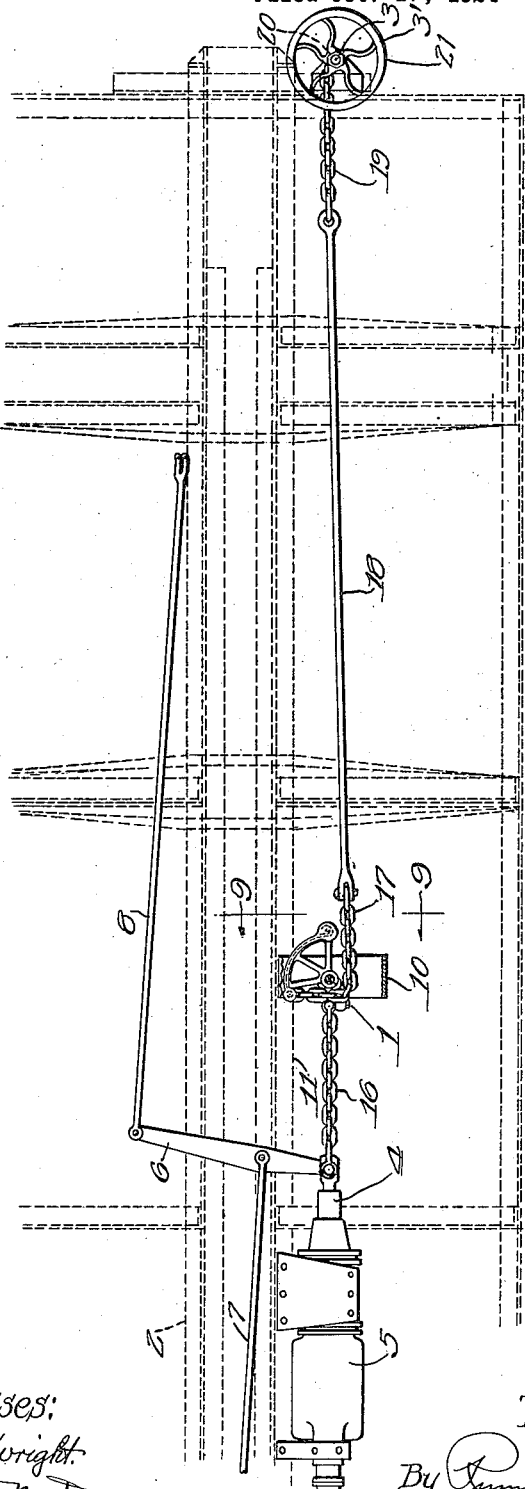
Fig. 1 is a plan of the brake control mechanism with parts of the car frame indicated by dotted lines, the booster being in its relaxed position.

In the construction shown in the drawings, the brake booster device 1 embodying this invention is attached to the underside of a railway car, the outline of the adjacent parts of the car-frame 2 being shown by dotted lines in one of the views, namely Fig. 1. The said booster or multiplying device, as shown by said view, is interposed mechanically between the hand brake shaft 3 and the push rod 4 of the air brake cylinder 5. Fig. 1 also shows the floating equalizing lever 6 and the oppositely disposed brake pull rods 7 and 8.

The mounting of the booster 1 is shown on a greatly enlarged scale in Fig. 9. The main pivot 9 of said booster is carried in a vertical position on the bracket 10 which stands out horizontally from and is fastened to a longitudinal floor beam 11, which may be the center sill of the car. Said bracket is positioned with one arm over the other and the tips being clamped to the sill 11 by bolts 12. Mounted oscillatably on said pivot 9 at or near the middle of said bracket 10 is a drum member 13, of cam-like character, having leverage characteristics. Said drum member has substantially a pair of cam faces whereby the drum is formed and adapted to progressively increase the power or force-multiplying effect as the hand wheel 3' is turned for applying the brakes manually, as will be more fully explained.

Said member 13 comprises substantially an axially perforated hub part 13' with two drums 14 and 15 thereon to receive the chains 16 and 17 respectively. Chain 16 leads to the push-rod 4 and lever 6. The chain 17 leads to the hand brake pull rod 18 which in turn extends to the complementary chain 19 which winds on the drum 20 at the foot of the shaft 3, on the upper end of which shaft the hand wheel 3' is mounted.

The upper and lower arms of bracket 10 are perforated medially at 10' and 10'' to receive the drum pivot 9. Said pivot has a head 9' at its upper end and is secured releasably by a cotter 9'' at its lower end.

Figure 3:
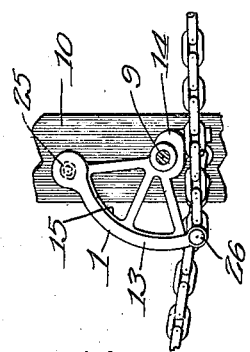
Fig. 3 shows the multiplying device in its neutral or non-effective position with the slack taken up and ready for positive multiplying effect upon further turning counter-clockwise.

The booster proper, which is carried by the bracket 10, is adapted to vary the speed ratios of the chains 16 and 17 from quick slack-take-up action to slow and more forceful tension setting action. It correspondingly varies the tension ratios in said chains from low take-up tension to high setting tension. This is accommodated and assured by forming the respective drums 14 and 15 substantially with oppositely curved faces. Referring to Fig. 5, it is apparent that the face of the left-chain drum 14 leads outwardly, in the counter-clock-wise direction, whereas the face of the right-chain drum 15 leads inwardly. Furthermore, the effective radius or leverage arm at the chain tangent point of drum 14 diminishes as the device is so turned in setting the brake, while the effective radius of the drum 15 increases. In fact the power multiplying factor of the booster in setting the brakes passes from slightly minus to greatly plus, the neutral or zero point being relatively near the starting position (Fig. 4). At the said neutral point the effective drum radii are equal and the chains 16 and 17 are substantially in alinement, at least in plan, as viewed in Fig. 3.

The cam part 14 is designed for great strength especially respecting means for securing the heavy tension chain 16 thereto. For this purpose an eye-bolt 21 is set in the outer end 14' of said cam which is perforated therefor at 22. In order to avoid rupture and to minimize shear stresses in the bolt 21, the corresponding cam face is formed to accommodate nesting of the bolt head 21' as at 23.

In order to avoid the necessity of having the chain 17 actually wind on the outstanding face part 15' of drum 15, and to avoid the difficulties usually incident to operating such a vertically positioned drum device, I provide an arcuate cam link 24 fitting over the major and outstanding part of cam 15. Said link is pivoted at one end as at 25 to the outer tip of cam 15 and at its other end as at 26 to chain 16. Said link is grooved on its concave inner face as at 27 to track upon and embrace the corresponding cam edge 15' when the booster is turned clockwise in releasing the brake. With this construction there is no slack chain to be kept in a horizontally facing drum groove, and thus by using the link device above described a serious source of trouble is avoided.

In order to accommodate ready removal of the link 24, the hinge connection at 25 is specially designed for disconnection by swinging said link back to an abnormal position, as in Fig. 6. The hinged end of said link 24 is forked to receive the tip 28 of cam 15. Said tip 28 is provided with oppositely projecting trunnion pivots 25 to engage the hooked fork arms 29 of said link. In assembling the device the pivots 25 enter through the hook openings 30 as will be apparent from Figs. 4 and 6. Withdrawal of link 24 is normally prevented by the shoulders 31 which stand out on the opposite sides of tip 28 in spaced relation to said pivots sufficient to admit the hook elements respectively.

The chain 17 is detachably connected to link 24 by means of the pin 26' which is releasably held in the forked end of the link by a cotter 32.

Whenever it is desired to set the brakes manually, the attendant will turn the wheel 3' to wind the chain 19 on drum 20. The slack in the rigging as a whole will be taken up quickly by the initial movement of wheel 3' by reason of the speed multiplying effect of the booster 1 in the slack position, as in Fig. 4. But as it passes through the one-to-one or neutral position, as in Fig. 3, the device becomes a power multiplier or "booster" in the sense here used. The booster ratio gradually increases by reason of the variable effective drum radii until about the position of Fig. 5 is reached, whereupon the link 24 begins to swing outward. The booster ratio still increases until the drum radius through pivot 25 becomes perpendicular to the direction of chain 17. The device is so adjusted that the brakes will be set at this point. Further turning decreases the ratio as will be apparent.

Figure 2:
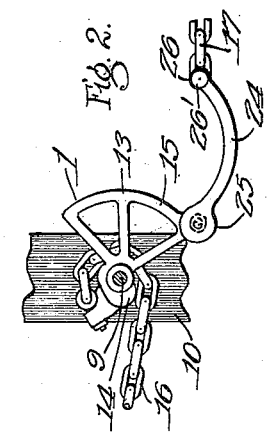
Fig. 2 shows the multiplying means in its brake set position of maximum tension.

The simplicity of the power multiplying drum 13 is especially notable. It is cast in one integral lump of substantially simple character adapted for ready production and finish without elaborate or unusual treatment. The hub part 13' and two cam parts 14 and 15 are all free from structural difficulties and include nothing to wear out or get out of order. In operation there is an angular position extending through a considerable angle where the pull is substantially a maximum. (See Fig. 2.) The link 24 always folds horizontally against the cam face 15 when the brake is released.

Although but one specific embodiment of this invention is herein shown and described, it is to be understood that numerous details of the construction shown may be altered or omitted without departing from the spirit of this invention as defined by the following claims.

I claim:

1. In a rotary brake booster a drum element having an eye-bolt set in the face thereof, a flexible tension member anchored to the eye end of said eye-bolt, said element being apertured to receive the eye part of the bolt nestingly therein, whereby shear and bending stresses in the bolt are minimized when tension is applied to said member.

2. In a booster device of the character described, a power multiplying drum and a tension member anchored thereto, said drum having an eye-bolt set therein for securing said member and the face of said drum being apertured to accommodate nesting of the bolt head therein to minimize shear and bending stresses in the bolt.

3. A brake booster for railway cars, comprising a pair of drum members rigidly connected together, one of said drum members having a segmental arcuate face and an arcuate link pivoted at one end to the one of said drum members adjacent to one end of its said cam face and being arranged to swing alternately away from and into snug-fitting relation to said face, and a two section tension member in which said booster is interposed with one section connected to the free end of said link and with the other section connected to the opposite drum member.

4. A brake booster drum member having a tension link pivotally related to the outer face thereof, said link and drum member being correlatively shouldered and apertured at the point of pivotal connection to normally retain said link, the apertured member being formed to release the shoulder member when the link is turned to a certain abnormal position for detachment.

5. A vehicle provided with a brake booster thereon having a cam drum part disposed horizontally in combination with an arcuate link pivotally secured thereto for tension arranged to swing against the outer face thereof in one position and to swing away in its opposite position.

6. In a device of the character described a drum mounted to turn on a vertical axis and having its winding plane disposed horizontally, in combination with a tension member to wind thereon and including a link curved to fit the face of said drum and being hinged thereto at one end.

7. In a device of the character described a drum mounted to turn on its axis, in combination with a tension member to wind thereon and including a link curved to fit the face of said drum, and said drum and link being provided with a mutually interfitting tongue and groove construction to insure true registry when swung together.

8. A winding link of arcuate shape formed and adapted for pivotal mounting at one end and having a longitudinal guide part extending lengthwise on its inner side.

Signed at Chicago this 14th day of October 1924.

THOMAS N. RUSSELL.